3,472,857
N-(3-PYRAZOLYL-PROPYL)-N'-PHENYL PIPERAZINES

Vishwa Prakash Arya, Bombay, India, assignor to Ciba Limited, Basel, Switzerland, a Swiss company
No Drawing. Filed Jan. 26, 1967, Ser. No. 611,807
Claims priority, application Great Britain, Feb. 3, 1966, 4,724/66; Switzerland, Dec. 13, 1966, 17,824/66
Int. Cl. C07d *51/64*

U.S. Cl. 260—268  10 Claims

ABSTRACT OF THE DISCLOSURE

N - [(1 - Het - 4 - pyr) - C(=X) - alk - CH$_2$] - N' - Ar-diazacycloalkanes of the formula

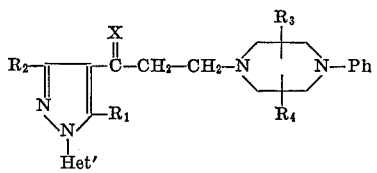

Het'=optionally substituted bicyclic benzoacyclic radical of aromatic characteristics,
Ph=optionally substituted phenyl group,
R$_1$=lower alkyl,
R$_2$=hydrogen or lower alkyl,
R$_3$, R$_4$=hydrogen or lower alkyl, and
X=oxygen, hydroxy+hydrogen, lower alkoxy+hydrogen, 2 hydrogens, or, together with a hydrogen a double bond to the neighboring methylene group, or salts thereof, for example, the compound

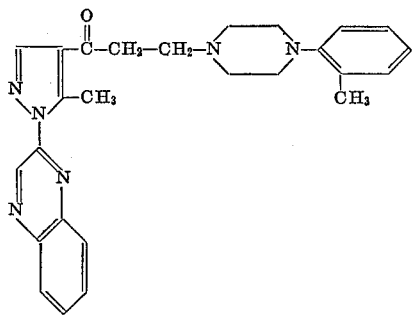

show antihypertensive effects.

SUMMARY OF THE INVENTION

The present invention relates to the manufacture of N - [(1 - Het - 4 - pyr) - C(=X) - alk - CH$_2$] - N' - Ar-diazacycloalkanes, in which the nitrogen atoms of the diazacycloalkane are separated one from one other by 2–3 carbon atoms, 1-Het-4-pyr represents a 4-pyrazolyl radical substituted in 1-position by the group Het representing a bicyclic azacyclic residue of aromatic characteristics, X stands for oxygen or a free or substituted hydroxyl group together with a hydrogen atom or two hydrogen atoms or a hydrogen atom together with a double bond linked with the C$_1$-carbon atom of the residue "alk," the latter representing a 1:1-lower alkylidene residue, and Ar represents an aromatic group or a heterocyclic group of aromatic character.

In the 1-Het-4-pyrazolyl radical the bicyclic azacyclic residue Het, in which each of the two rings preferably has 5 to 6 ring members, contains one, two or more than two nitrogen atoms as ring members; apart from the ring-nitrogen atom(s) the residue may contain further heteroatoms, such as oxygen or sulfur atoms as ring members.

The bicyclic azacyclic residue Het may be unsubstituted or contain substituents, such as aliphatic hydrocargon radicals, for example, lower alkyl, e.g. methyl, ethyl, n-propyl, isopropyl or n-butyl, etherified hydroxy, such as lower alkoxy, for example, methoxy or ethoxy, or lower alkylene-dioxy, for example, methylenedioxy group, and/or esterified hydroxy group, particularly halogeno, for example, fluoro, chloro or bromo, as well as pseudohalogeno groups, for example, trifluoromethyl, and/or nitro.

More particularly, the bicyclic azacyclic residue Het is a bicyclic benzoazacyclic radical of aromatic characteristics, in which the azacyclic nucleus has 5 to 6 ring members and contains at most two nitrogen atoms or a nitrogen atom together with an oxygen or a sulfur atom as ring members. Such radical is, for example, an indolyl, such as a 3-indolyl group, a quinolyl, such as a 2-quinolyl, 3-quinolyl-, 4-quinolyl or 8-quinolyl group, an isoquinolyl, such as a 1-isoquinolyl radical, a cinnolinyl, such as a 3-cinnolinyl or a 4-cinnolinyl group, a quinazolinyl, such as a 2-quinazolinyl or a 4-quinazolinyl radical, a quinoxalinyl, such as a 2-quinoxalinyl group, a phthalazinyl, such as a 1-phthalazinyl group, a benzotriazinyl, such as 1,2,3-benzotriazinyl or a 1,2,4-benzotriazinyl radical, a benzothiadiazinyl, such as a 1,1-dioxo-2H-1,2,3-benzothiadiazinyl-4-yl radical, a benzimidazolyl, such as a 1-lower alkyl-2-benzimidazolyl radical, a benzoxazolyl, such as a 2-benzoxazolyl group, a benzisoxazolyl, such as a 3-benzisoxazolyl radical, a benzothiazolyl, such as a 2-benzothiazolyl group, or a benzisothiazolyl, such as a 3-benzisothiazolyl group; these radicals are unsubstituted or may contain one, two or more than two of the same or different substituents, such as those mentioned above.

The new compounds may also contain further substituents in the pyrazole nucleus, especially lower alkyl, phenyl or pyridyl radicals, whereby phenyl and pyridyl radicals may be substituted, for example, by lower aliphatic hydrocarbon radicals, such as lower alkyl, etherified hydroxy, such as lower alkoxy or lower alkylenedioxy, esterified hydroxy, such as halogeno, and/or pseudohalogeno, such as trifluoromethyl, especially the substituents described above. The pyrazole nucleus advantageously contains a lower alkyl radical in 5-position, for example, one of the radicals indicated above, especially a methyl group.

A hydroxyl group present in —C(=X)— is advantageously a free hydroxyl group. If substituted, it may represent an etherified hydroxy group, e.g. a hydroxyl group substituted with a lower aliphatic hydrocarbon radical, for example, a lower alkyl or alkenyl, such as a methyl, ethyl, propyl, isopropyl, or allyl radical. A substituted hydroxyl group may also represent an esterified hydroxyl group, for example, a hydroxyl group esterified by an amino-, lower alkylamino-, di-lower alkylamino- or lower alkoxy-formic acid or by a lower alkane carboxylic acid, such as acetic or propionic acid.

The radical Ar is preferably at most bicyclic and is above all a phenyl or a pyridyl radical, each of which may be substituted, for example, by lower aliphatic hydrocarbon radicals such as lower alkyl, etherified hydroxy, such as lower alkoxy or lower alkylenedioxy, esterified hydroxy, such as halogeno, pseudohalogeno, such as trifluoromethyl, and/or nitro, especially those indicated above.

The radical "alk" is 1,1-lower-alkylidene radical, for example, 1,1-ethylidene or 1,1-propylidene, but more especially methylene.

Diazacycloalkanes, in which the nitrogen atoms are separated from each other by 2 or 3 carbon atoms, are above all piperazine, as well as 1,4-diazacycloheptane or 1,5-diazacyclooctane and their C-lower alkyl substitution derivatives, for example, 2-methyl- or 2,6-dimethyl-piperazine, as well as 2-methyl-1,4-diazacycloheptane.

The new compounds possess valuable pharmacological properties. Apart from adrenolytic and psychotropic activities, they show primarily hypotensive effects, as can be demonstrated, for example, in animal tests, using for example, cats, dogs and rats as test animals. The new compounds are, therefore, useful as antihypertensive agents. Furthermore, they can also be used as intermediates for the preparation of other useful products, particularly of pharmacologically active compounds.

Outstanding pharmacological effects are shown by the compounds of the formulae

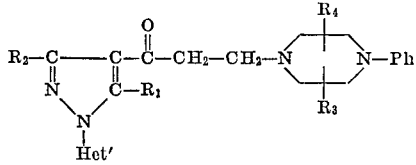

(I)

and

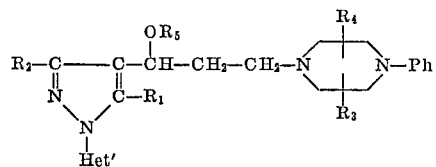

(II)

as well as

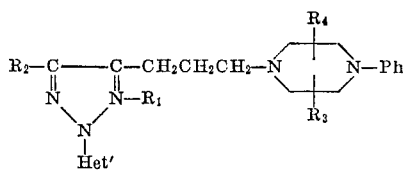

(III)

and

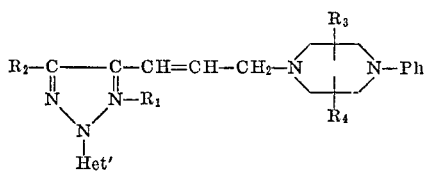

(IV)

in which $R_1$ is a lower alkyl, especially methyl radical, $R_2$ stands for a lower alkyl group or preferably for hydrogen, Het' represents a bicyclic benzoacyclic radical of aromatic characteristics, in which the azacyclic nucleus has 5 to 6 ring members and contains at most two nitrogen atoms or a nitrogen atom together with an oxygen atom or a sulfur atom as ring heteroatoms, especially a bicyclic benzoazacyclic radical, in which the azacyclic nucleus has 5 ring members and one nitrogen atom together with a sulfur or an oxygen atom as ring heteroatoms, or has 6 ring members and at most two nitrogen atom or two nitrogen atoms together with a sulfur atom as ring heteroatoms, which groups are unsubstituted or substituted by one, two or more than two lower alkyl, lower alkoxy, trifluoromethyl groups and/or halogen atoms Ph is an unsubstituted phenyl radical or a phenyl radical substituted by one, two or more lower alkyl, lower alkoxy, trifluoromethyl groups and/or halogen atoms, the above substituents of Ph and Het' being particularly methyl, methoxy, ethoxy, trifluoromethyl groups, chloro, bromo, and/or fluoro atoms, each of the groups $R_3$ and $R_4$ represents especially hydrogen or a lower alkyl, particularly methyl radical, and $R_5$ stands for hydrogen or a lower alkyl, especially a methyl or an ethyl radical, and salts thereof.

Particularly valuable are the compounds of the following formulae

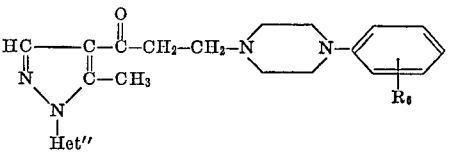

(Ia)

and

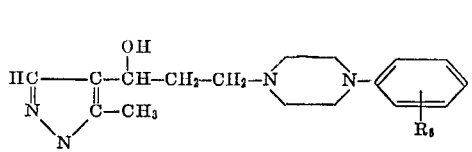

(IIa)

as well as

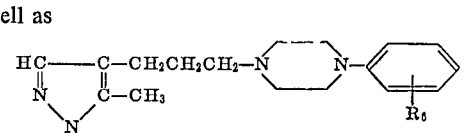

(IIIa)

and

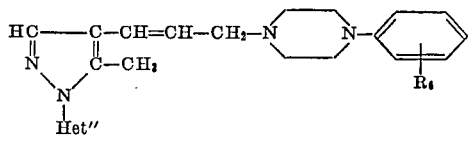

(IVa)

in which Het" is a benzothiazolyl, a quinolyl, an isoquinolyl, a cinnolinyl, a quinazolinyl, a phthalazinyl or especially a quinoxalinyl radical, particularly a 2-benzothiazolyl, a 2-quinolyl, a 4-quinolyl, a 1-isoquinolyl, a 3-cinnolinyl, a 4-cinnolinyl, a 2-quinazolinyl, a 4-quinazolinyl, a 1-phthalazinyl, a 1,1-dioxo-2H-1,2,3-benzothiadiazin-4-yl or especially a 2-quinoxalinyl radical, which radicals are unsubstituted or contain lower alkyl, lower alkoxy and/or halogeno, especially methyl, ethyl, methoxy, ethoxy, fluoro, chloro or bromo, as substituents, and $R_6$ stands for a lower alkyl, particularly methyl groups, a lower alkoxy, particularly a methoxy or ethoxy group, or a trifluoromethyl group, or a halogen, particularly a fluorine, chlorine or bromine atom, as well as a hydrogen atom. Preferred are the above compounds of the Formulae Ia to IVa, particularly those of the Formulae Ia and IIa, in which $R_6$ has the above given meaning and Het" is the 2-quinoxalinyl or the 3-methyl-2-quinoxalinyl radical and in particular the 4-{3-[4-(2-methyl-phenyl)-piperazino]-1-oxo-propyl}-5-methyl-1-(2-quinoxalinyl) - pyrazole and the 4-{3-[4-(4-fluoro-phenyl)-piperazine]-1-oxo - propyl}-5-methyl-1-(3-methyl-2 - quinoxalinyl) - pyrazole which when given orally and intravenously to rats, cats and dogs at doses of about 0.00025 g./kg. to about 0.01 g./kg., show outstanding hypotensive, as well as adrenolytic effects.

The new compounds are obtained by methods in themselves known, for example, by (a) reacting a 4-lower alkanoyl-1-Het-pyrazole with formaldehyde and an N-unsubstituted N'-Ar-diazacycloalkane, the nitrogen atoms of which are separated from each other by 2–3 carbon atoms, or an amine compound having at least one hydrogen atom attached to the nitrogen atom and permitting the formation of the N'-Ar-diazacycloalkane ring, and forming in a resulting compound having a group capable of being converted into the N'-Ar-diazacycloalkane ring the latter from such group, or (b) reacting a 4-[Y-CH$_2$-alk-C(=X)]-1-Het-pyrazole or a 4-[CH$_2$-alkyl'-C(=X)]-1-Het pyrazole, where Y is an eliminable group and alk' is a 1,1,1-lower alkylidyne group, with the above-mentioned N'-Ar-diaza-cycloalkane or amine compound and converting in a resulting compound containing a group convertible into the N'-Ar-diazacycloalkane ring such group into the latter, or (c) reductively replacing in an N-[(1-

Het-4-pyr)-C(=X)-alk-CH$_2$]-N'-Ar-diazacycloalkane, in which at least one of the methylene groups adjacent to the ring-azanitrogen atoms of the diazacycloalkane ring carries an oxo or a thiono group, such group by 2 hydrogen atoms, or (d) reacting an N-[(acyl-formyl-methyl)-C(=X)-alk-CH$_2$] - N'-Ar-diazacycloalkane, in which "acyl" represents the residue of an organic carboxylic acids, or an enol or enol derivative thereof with a Het-hydrazine, or (e) reducing in an N-[(1-Het-4-pyr)-C(=X)-alk'-=CH]-N'-Ar-diazacycloalkane the olefinic double bond, and if desired or required, reducing at any stage of the process the oxo group into a hydroxyl group, and/or converting a hydroxyl group into a substituted hydroxyl group, and/or oxydizing a hydroxyl group to an oxo group or eliminating it, and/or introducing or reducing a double bond X linked with the C$_1$-carbon atom of the residue "alk," and/or, if desired, converting in a resulting compound a substituent into another, and/or eliminating substituents present or introducing substituents into resulting compounds, and/or, if desired, converting a resulting free base into a salt or a resulting salt into the free base or into another salt, and/or, if desired or required, resolving a resulting mixture of isomers into its constituent isomers.

The reaction of the starting material with formaldehyde and the N'-Ar-diazacycloalkane or the amino compound is carried out by the Mannich method. Apart from formaldehyde there may also be used a formaldehyde donor, for example, paraformaldehyde or dimethoxymethane, and, if desired or required, the reaction may be carried out in the presence of an acid. The N-Ar-diazacycloalkane or the amine compound is preferably used in the form of a salt thereof.

The reaction is preferably conducted in the presence of a solvent, for example, of an alcohol or dioxane. When a formaldehyde polymerization product is used, the reaction is preferably carried out in an organic solvent, such for example, as one of those mentioned above, or in benzene, toluene, nitrobenzene or nitromethane. The reaction is preferably carried out at an elevated temperature, if desired, under superatmospheric pressure and/or in an inert gas.

An eliminable group Y in a 4-[Y-CH$_2$-alk-C(=X)]-1-Het-pyrazole is, for example, a reactive esterified hydroxyl group, such, for example, as a hydroxyl group esterified with a hydrohalic acid or sulphuric acid or with a strong organic sulphonic acid such, for example, as a benzenesulphonic or toluenesulphonic acid; preferably, it represents a halogen atom or an organic sulphonyloxy group such, for example, as a p-toluene-sulphonyloxy group. A reactive esterified hydroxyl group Y may also be a suitable carbonyloxy, for example, an acetyloxy or ethoxy-carbonyloxy group; the group Y may also stand for an N-unsubstituted, N-monosubstituted or N-polysubstituted amino group (in which case the starting material is advantageously used in the form of a salt thereof). The group X is an oxo group, as well as two hydrogen atoms. A corresponding unsaturated 4-(CH$_2$=alk'-C(=X))]-1-Het-pyrazole may also be formed in situ from the above mentioned 4-[Y-CH$_2$-alk-C(=X)]-1-Het-pyrazole. The reaction of these starting materials with the N'-Ar-diazacycloalkane or the amino compound is carried out in the usual manner, preferably in the presence of an acid acceptor such, for example, as a basic condensing agent.

An amine compound, suitable for the formation of an N'-Ar-diazacycloalkane ring, is for example, ammonia or especially a primary or secondary amine the substituents of which allow cyclization with formation of the desired N'-Ar-diazacycloalkane ring. Such substituents are, for example, alkyl groups carrying in $\beta$- or $\gamma$-position an N-Ar-amino group containing at least one hydrogen atom or a free or reactive esterified hydroxyl group.

The formation of the N'-Ar-diazacycloalkane ring from a suitable substituent present in an intermediate obtainable according to the above procedure follows the usual practice. Thus, for example, a free amino group may be reacted with a reactive diester of a suitable N-Ar-N,N-bis-(hydroxy-alkyl)-amine, in whcih "allyl" separates the hydroxy group from the amino nitrogen by 2 to 3 carbon atoms, and a reactive diester is primarily one with the above acids, particularly hydrohalic acids, or with an N-Ar-oxa-azacycloalkane or an N-Ar-thiazacycloalkane, in which the ring-nitrogen atom is separated from the oxa-oxygen or thia-sulfur atom by 2–3 carbon atoms, to form the N'-Ar-diaza-cycloalkane ring the latter reaction being preferably carried out at an elevated temperature, if necessary, in a closed vessel under pressure.

The amines mentioned above, which contain suitable substituents on the nitrogean atom and which are capable of forming the N'-Ar-diazacycloalkane ring, are also accessible by simultaneous or stepwise mono- or di-substitution of a free amino compound with a reactive derivative of an alkanol that contains in the $\beta$- or $\gamma$-position an N-Ar-amino group with at least one hydrogen atom or a free or reactive esterified hydroxyl group, for example, with a reactive ester of such alkanol or a corresponding epoxide. In a resulting secondary 3-(1-Het-pyr)-3-X-propylamine compound containing a free hydroxyalkyl substituent, a free hydroxyl group may, if necessary, first be converted into a reactive esterified hydroxyl group by a known method, for example, treatment with a sulphur- or phosphorus-containing halide, especially thionylchloride, or with an organic sulphonyl halide, especially a sulphonyl-chloride, whereupon the resulting ester compound is treated with an N-Ar-amine and then with a reactive diester of a suitable alkanediol. In a resulting compound containing an amino group substituted by a secondary N-Ar-aminoalkyl radical and a hydroxyalkyl group the hydroxyl group may be converted by esterification into a reactive esterified hydroxyl group, whereupon the cyclization reaction is carried out.

In compounds containing an amino group with $\beta$- or $\gamma$-hydroxyalkyl radicals, cyclization can be achieved by treatment with an N-Ar-amine, if necessary, after having converted the hydroxyl groups into reactive esterified hydroxyl groups. A resulting di-(secondary aminoalkyl)-amino compound may be cyclized directly.

The reductive replacement of an oxo or thiono group by 2 hydrogen atoms follows the usual practice. A carbonyl group is converted into a methylene group, for example, by treating the starting material with a suitable light metal hydride reducing agent, for example, lithium aluminium hydride, if necessary, in the presence of an activator such, for example, as aluminium chloride, or with hydrogen in the presence of a suitable catalyst such, for example, as a copper-chromium catalyst, a thiocarbonyl group, for example, by treatment with a hydrogenating catalyst such, for example, as Raney nickel, in the presence of a suitable solvent such, for example, as ethanol. During this reaction any simultaneously reducible substituents, for example, an oxo group X, may be reduced as well and, for instance be converted into a hydroxyl group.

The reaction of an Het-hydrazine is preferably carried out with a suitable enol derivative, particularly a lower alkyl, e.g. methyl or ethyl ether of the enol of an N-[(acyl - formylmethyl) - C(=X) - alk - CH$_2$] - N' - Ar - diazacycloalkane; one may proceed stepwise, i.e., a hydrazono intermediate, may be formed which may then be ring-closed, for example, by heating, into the desired product.

An olefinic double bond in an N-[(1 - Het - 4 - pyr) - C(=X)-alk'=CH]-N'-Ar-diazacycloalkane is saturated, for example, by catalytic hydrogenation, such as treatment with hydrogen in the presence of a noble metal catalyst, such as a palladium catalyst, if necessary, under pressure. Simultaneously, other reducible groups in the molecule, such as an oxo group, may also be reduced.

An oxo group in a resulting compound is converted into a hydroxyl group in known manner at any stage of the process. Reduction with nascent hydrogen is advantageously performed, for example, by treatment with a metal such as for example, sodium, in the presence of a hydrogen donor, such as, for example, an alcohol, complex metal hydrides, for example, sodium borohydride, or catalytically activated hydrogen, for example, in the presence of a platinum, palladium, nickel, copper or rhodium catalyst, such as platinum oxide, palladium carbon, Raney nickel, copper chromite or rhodium on a carrier such, for example, as aluminum oxide or carbon, may likewise be used. The reduction is preferably performed in the presence of a solvent and/or with cooling, at room temperature or with heating, under atmospheric or increased pressure. It may also be performed according to the Meerwein Ponndorf-Verley method, for example, by treatment with a lower alkanol such, for example, as isopropanol, in the presence of a suitable alcoholate, such, for example as aluminium isopropylate.

The substitution of a free hydroxyl group X in a resulting compound, especially its etherification or esterification, is carried out in a known manner. Thus, for example, there may be used diazo compounds such as, for example, diazo-lower alkanes, which are advantageously used in the presence of a suitable Lewis acid, for example, fluoboric acid, aluminium chloride, boron trifluoride etherate or an aluminium lower alkanoate. Alternatively, a metal salt may be prepared and then reacted with a reactive ester of an alcohol; or the hydroxyl group may be reactive esterified, for example, converted into a halogen atom or into an organic sulphonyloxy group and then treated with an alcohol, preferably in the form of a metal compound; in this manner a compound is obtained which contains an etherified hydroxyl group. Esterification of a hydroxy group X is preferably carried out by reaction with an acid halide, acid anhydride, ketene, isocyanate or isothiocyanate, if necessary or desired, in the presence of a condensing agent such, for example, as a base capable of combining with acids.

If desired, a hydroxyl group X may be converted into an oxo group in known manner with a suitable oxidation reagent such as, for example, a chromium-VI-compound. A hydroxyl group X may also be eliminated together with a hydrogen atom, if desired, after conversion into a suitably esterified hydroxyl group, for instance into a halogen atom, for example, by treatment with an acid agent such, for example, as a mineral acid, e.g. hydrochloric acid, or with a basic agent, whereupon the unsaturated compound is obtained, in which X represents a hydrogen atom together with a double bond, linked with the $C_1$ carbon atoms of the residue "alk"; by reduction, for example, with catalytically activated hydrogen, a hydroxyl group X may be eliminated to yield directly the saturated compound, in which X represents two hydrogen atoms.

A double bond X, linked with the $C_1$ carbon atom of the group "alk" can be saturated reductively, for example, by treatment with catalytically activated hydrogen. It may be introduced, for example, as described above, by elimination of a free or reactive esterified hydroxyl group together with hydrogen.

Furthermore, substituents present in resulting compounds may be converted into other substituents. Thus, nitro groups may be subsequently reduced in the usual manner, for example by treatment with catalytically activated hydrogen, nascent hydrogen or with metal hydrides, such as lithium aluminium hydride or sodium borohydride; this reaction may be carried out simultaneously with a reduction of the oxo group to the hydroxyl group.

In the process of the invention the reactions are carried out in the usual manner, in the presence or absence of diluents and/or catalysts, and/or condensing agents, if necessary, while cooling or heating in a closed vessel under increased pressure, and/or in the atmosphere of an inert gas, e.g. nitrogen.

Depending on the reaction conditions, the new compounds are obtained either in free form or in the form of their salts. The salts of the compounds of the present invention are acid addition salt, particularly pharmaceutically acceptable acid addition salt, such as those with inorganic acids, for example, hydrochloric, hydrobromic, nitric, sulfuric or phosphoric acid, but also those with organic acids, for example, organic carboxylic acids, such as acetic, propionic, glycolic, malonic, succinic, maleic, hydroxymaleic, fumaric, malic, tartaric, citric, benzoic, cinnamic, mandelic, salicylic, 4-amino-salicylic, 2-phenoxy-benzoi, 2-acetoxy-benzoic, pamoic, glucuronic, nicotinic or isonicotinic acid, or organic sulfonic acids, for example, methane sulfonic, ethane sulfonic, 2-hydroxyethane sulfonice, 1,2-ethane disulfonic, benzene sulfonic, p-toluene sulfonic, 2-naphthalene sulfonic or cyclohexanesulfamic acid. Other acid addition salts may be used as intermediate products, for example, in the purification of the free compounds or in the preparation of other salts, as well as for identification purposes. Salts especially useful for the latter are, for example, those with perchloric acid, or with organic nitro compounds, e.g. picric, picrolonic or flavianic acid, or with metal complex acids, e.g. phosphotungstic, phosphomolybdic, chloroplatinic or Reinecke acid. Mono- or poly-salts may be formed.

Resulting salts may be converted into the free bases, for example, by a treatment with an alkaline reagent, for example, with an alkali or alkaline earth metal hydroxide, an alkali or alkaline earth metal carbonate, or ammonia or with a suitable ion exchange preparation.

Resulting salts may be converted into other salts, for example, by treatment with an ion exchange preparation or by treating a salt of an inorganic acid with a metal salt, for example, the sodium, barium or silver salt of an acid in a suitable solvent in which a resulting inorganic salt is insoluble and is thus precipitated out of the reaction mixture.

The free bases obtained may be converted into their acid addition salts by reaction with acids, for example, with those mentioned above, such as by treating the solution of a base in a suitable inert solvent or solvent mixture with an acid or a solution thereof, or with a suitable anion exchange preparation, and isolating the desired salt. Resulting salts may also be obtained in the form of their hydrates or contain the solvent used for crystallization. Due to the close relationship between the new compounds in free form and in the form of salts thereof, whenever a free compound or a salt is referred to in this context, a corresponding salt and free compound, respectively is also intended, provided such is possible or appropriate under the circumstances.

Mixtures of isomers are separated into the single isomers according to known methods. Thus, resulting racemates may be resolved into the optically active d- and l-forms by known methods, for example, by crystallization from optically active solvents or by formation of the diastereoisomeric salts of the racemic compound with the optically active form of an acid and separation of the resulting mixture of the diastereoisomeric salts into the optically active salts. Advantageously, the optically active isomer of a racemic mixture with more pronounced pharmacological effects is isolated.

The invention further includes any modification of the present process in which an intermediate product resulting at any stage of the process is used as the starting materials and any remaining steps is (are) carried out, or the process is discontinued at any stage, or in which a starting material is formed under reaction conditions or used in the form of a derivative, such as a salt thereof. The invention also includes any new intermediate products that are formed.

In the process of the present invention there are advantageously used those starting materials which yield the compounds described in the foregoing as being especially valuable.

The starting materials are known or may be obtained by known methods. Thus, 4-lower alkanoyl-1-Het-pyrazoles are manufactured, for example, by reacting an N-Het-hydrazine with a β-hydroxymethylene-α,γ-dione compound and ring-closing a resulting hydrazone compound, for example, by heating it. A 1-Het-4-[H$_2$N-CH$_2$-alk-C(=X)]-pyrazole is prepared, for example, according to the process modifications used for the manufacture of the final products, in which an amine suitable for the formation of the N'-Ar-diazacycloalkane may be used instead of the N'-Ar-diazacycloalkane; ammonia or an ammonia-furnishing reagent is used for the formation of the primary amine starting material. The N-[(acyl-formylmethyl) - C(=X) - alk - CH$_2$] - N' - Ar - diazacycloalkane may be obtained, for example, by treatment of an N - [(acyl - methyl) - C(=X) - alk - CH$_2$] - N' - Ar-diazacycloalkane with a suitable derivative of formic acid or orthoformic acid, such as a lower alkyl ester, and, if necessary, converted into a suitable enol derivative according to known methods. An N-[(1-Het-4-pyr)-C(=X)-alk'=CH]-N'-Ar-diazacycloalkane may be obtained, for example, by treatment of a 4-[formyl-alk-C(=X)]-1-Het-pyrazole with an N-unsubstituted N'-Ar-diazacycloalkane, preferably in the presence of an acidic reagent, such as p-toluene sulfonic acid, with the formation of the desired enamine, or from a 1-Het-4-[cyano-alk-C(=X)]-pyrazole by treatment with an N-unsubstituted N'-Ar-diazacycloalkane under reductive conditions, for example, while treating with hydrogen in the presence of Raney nickel.

The compounds of the present invention are intended for use as medicaments, for example, in the form of pharmaceutical preparations which contain these compounds in admixture on conjunction with an organic or inorganic, solid or liquid pharmaceutical excipient suitable for enteral, for example, oral, or parenteral administration. The pharmaceutical preparations may be in solid, for example, as tablets, dragees or capsules, or in liquid form as solutions, suspensions or emulsions. They contain the usual carrier materials and may include auxiliary substances, such as preserving, stabilizing, wetting or emulsifying agents, salts for regulating the osmotic pressure, buffers, dyestuffs or flavouring agents. They are prepared according to known methods and may further contain other therapeutically valuable substances.

The following examples illustrate the invention; temperatures are given in degrees centigrade.

EXAMPLE 1

A mixture of 5.04 g. of 4-acetyl-5-methyl-1-(2-quinoxalinyl)-pyrazole and 1.8 g. of paraformaldehyde in 70 ml. of ethanol is treated with 5 g. of 1-(2-methyl-phenyl)-piperazine hydrochloride and 4 drops of concentrated hydrochloric acid and is boiled under reflux for 24 hours. On cooling the 5-methyl-4-{3-[4-(2-methyl-phenyl)-piperazino] - 1 - oxo-propyl} - 1 - (2 - quinoxalinyl)pyrazole hydrochloride of the formula

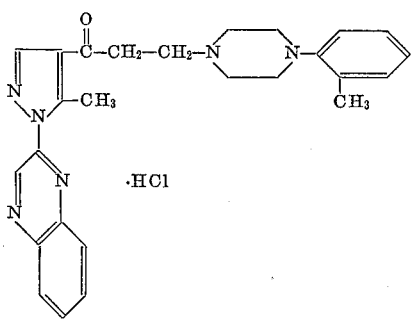

crystallizes out. After recrystallization from methanol it melts at 230° (dec.). The base, prepared from the above salt, crystallizes from methanol and melts at 120°.

The starting material is obtained as follows:
A mixture of 3.12 g. of ethoxymethylene-acetylacetone in 50 ml. of chloroform is cooled to 0° and a solution of 3.4 g. of 2-hydrazino-quinoxaline in 300 ml. of chloroform is added dropwise at 5° and is stirred at room temperature for 18 hours. The crystalline precipitate is filtered off and recrystallized from methanol; the resulting 4-acetyl - 5 - methyl-1-(2-quinoxalinyl)-pyrazole melts at 145°.

EXAMPLE 2

A solution of 0.8 g. 5-methyl-4-{3-[4-(2-methyl-phenyl)-piperazino] - 1 - oxo-propyl}-1-(2-quinoxalinyl)-pyrazole in 5 ml. of chloroform is treated with a solution of 0.23 g. of maleic acid in 20 ml. of ether at 0°. A crystalline precipitate is formed and is filtered off and recrystallized from methanol to afford the 5-methyl-4-{3-[4 - (2 - methyl - phenyl)-piperazino] - 1 - oxo-propyl}-1-(2-quinoxalinyl)-pyrazole maleate which melts at 176–177°.

EXAMPLE 3

A solution of 0.8 g. of 5-methyl-4-{3-[4-(2-methyl-phenyl)-piperazino]-1-oxo-propyl} - 1 - (2-quinoxalinyl)-pyrazole in 5 ml. of chloroform is treated with a 9.6% (weight per volume) solution of methane sulphonic acid in isopropanol at 0°. On addition of 20 ml. of anhydrous ether, a crystalline precipitate is formed which is recrystallized from methanol to afford the 5-methyl-4-{3-[4-(2-methyl-phenyl)-piperazino] - 1 - oxo-propyl} - 1 - (2-quinoxalinyl)-pyrazole methane sulfonate which melts at 205–206° (dec.).

EXAMPLE 4

A mixture of 4.5 g. of 4-acetyl-5-methyl-1-(2-quinoxalinyl)-pyrazole and 1.6 g. of paraformaldehyde in 55 ml. of ethanol is treated with 4.9 g. of 1-(2-chloro-phenyl)-piperazine hydrochloride and 4 drops of concentrated hydrochloric acid and boiled under reflux for 24 hours. On cooling, the 4-{3-[4-(2-chloro-phenyl)-piperazino]-1-oxo-propyl}-5-methyl-1-(2 - quinoxalinyl)-pyrazole hydrochloride of the formula

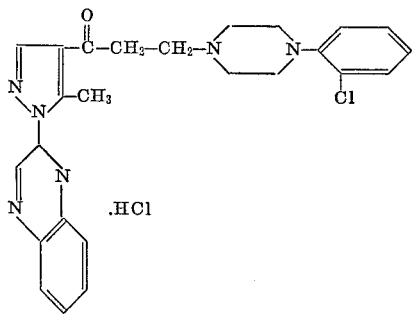

crystallizes out. After recrystallizations from methanol, it melts at 212° (dec.).

EXAMPLE 5

A mixture of 5.04 g. of 4-acetyl-5-methyl-1-(2-quinoxalinyl)-pyrazole and 1.8 g. of paraformaldehyde in 60 ml. of ethanol is treated with 5 g. of 1-(4-fluoro-phenyl)-piperazine dihydrochloride and 4 drops of concentrated hydrochloric acid and boiled under reflux for 24 hours. On cooling, the 4-{3-[4-(4-fluoro-phenyl)-piperazino]-1-oxo-propyl}-5-methyl-1-(2-quinoxalinyl)-pyrazole hydrochloride of the formula

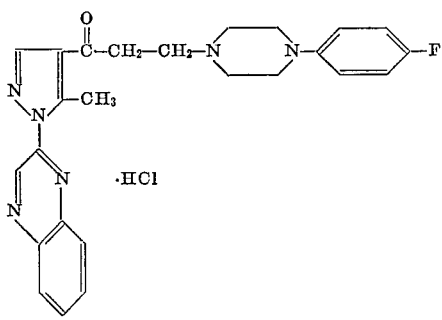

crystallizes out. After recrystallization from methanol, it melts at 222° (dec.).

EXAMPLE 6

A mixture of 3.99 g. of 4-acetyl-5-methyl-1-(3-methyl-2-quinoxalinyl)-pyrazole and 2.4 g. of paraformaldehyde in 40 ml. of ethanol is treated with 3.77 g. of 1-(4-fluoro-phenyl)-piperazine dihydrochloride and 4 drops of concentrated hydrochloric acid and boiled under reflux for 24 hours. On cooling, the 4-{3-[4-(4-fluoro-phenyl)-piperazino] - 1 - oxo-propyl} - 5 - methyl-1-(3-methyl-2-quinoxalinyl)-pyrazole hydrochloride of the formula

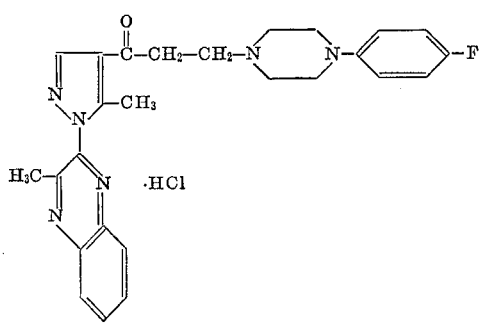

crystallizes out. After recrystallization from methanol, it melts at 190 (dec.).

The starting material is obtained as follows: A mixture of 4 g. of ethoxymethylene-acetylacetone in 50 ml. of chloroform is cooled to 0° and a solution of 4.35 g. of 2-hydrazino-3-methyl-quinoxaline in 400 ml. of chloroform is added dropwise at 5°. The reaction mixture is stirred at room temperature for 18 hours; the resulting crystalline precipitate is filtered off and recrystallized from methanol. The 4-acetyl-5-methyl-1-(3-methyl-2-quinoxalinyl)-pyrazole melts at 125°.

EXAMPLE 7

A mixture of 5.02 g. of 4-acetyl-5-methyl-1-(2-quinolyl)-pyrazole and 1.8 g. of paraformaldehyde in 70 ml. of ethanol is treated with 5.30 g. of 1-(2-methoxy-phenyl)-piperazine dihydrochloride and 4 drops of concentrated hydrochloric acid and is boiled under reflux for 24 hours. On cooling, the 4-{3-[4-(2-methoxy-phenyl)-piperazino]-1-oxo-propyl} - 5 - methyl-1-(2-quinolyl)-pyrazole hydrochloride of the formula

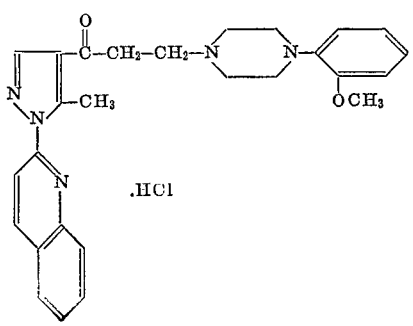

crystallizes out. After recrystallization from methanol, it melts at 224–225° (dec.).

The starting material is prepared as follows: A mixture of 78 g. of ethoxymethylene-acetylacetone in 250 ml. of chloroform is cooled to 0° and a solution of 79.2 g. of 2-hydrazino-quinoline in chloroform is added portionwise at 5°. The reaction mixture is stirred at room temperature for 18 hours, then evaporated to dryness and the crystalline residue is recrystallized from methanol to afford 4-acetyl-5-methyl-1-(2-quinolyl)-pyrazole, M.P. 96°.

EXAMPLE 8

A mixture of 5.02 g. of 4-acetyl-5-methyl-1-(2-quinolyl)-pyrazole and 1.8 g. of paraformaldehyde in 70 ml. of ethanol is treated with 5 g. of 1-(2-methyl-phenyl) piperazine hydrochloride and 4 drops of concentrated hydrochloric acid and boiled under reflux for 24 hours. On cooling, the 5-methyl-4-{3-[4-(2-methyl-phenyl)-piperazino]-1-oxo-propyl}-1-(2-quinolyl) - pyrazole hydrochloride of the formula

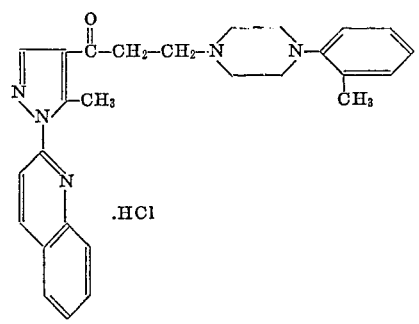

crystallizes out. After recrystallization from methanol, it melts at 233° (dec.).

EXAMPLE 9

A mixture of 5.1 g. of 4-acetyl-5-methyl-1-(2-quinolyl)-pyrazole and 1.8 g. of paraformaldehyde in 65 ml. of ethanol is treated with 5.1 g. of 1-(4-fluoro-phenyl)-piperazine dihydrochloride and 4 drops of concentrated hydrochloric acid and boiled under reflux 24 hours. On cooling, the 4-{3-[4-(4-fluoro-phenyl)-piperazino]-1-oxo-propyl}-5-methyl-1-(2-quinolyl) - pyrazole hydrochloride of the formula

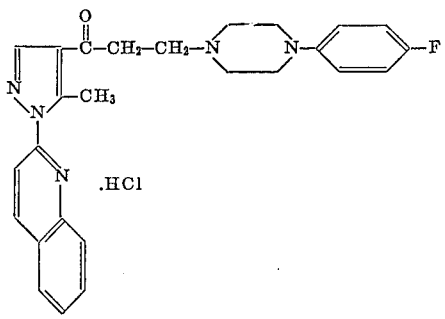

crystallizes out. After recrystalization from methanol, it melts at 225° (dec.).

EXAMPLE 10

A mixture of 2.5 g. of 4-acetyl-5-methyl-1-(8-quinolyl)-pyrazole and 0.9 g. of paraformaldehyde in 30 ml. of ethanol is treated with 2.4 g. of 1-(2-methyl-phenyl)-piperazine hydrochloride and 4 drops of concentrated hydrochloric acid and boiled under reflux for 24 hours. On cooling, the 5-methyl-4-{3-[4-(2-methyl-phenyl)-piperazino]-1-oxo-propyl}-1-(8-quinolyl) - pyrazole hydrochloride hemihydrate of the formula

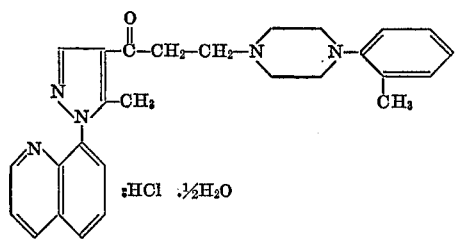

crystallizes out. On recrystallization from a mixture of methanol, isopropanol and ether, it melts at 222° (dec.).

The starting material is obtained as follows: A solution of 9.8 g. of ethoxymethylene-acetylacetone in 50 ml. of chloroform is cooled to 0° and treated with a solution of 10 g. of 8-hydrazino-quinoline at 50°. On cooling, a crystalline precipitate is formed which is filetred off and recrystallized from a mixture of methanol and isopropanol to afford 4-acetyl-5-methyl-1-(8-quinolyl)-pyrazole, M.P. 173°.

EXAMPLE 11

A mixture of 5.04 g. of 4-acetyl-5-methyl-1-(1-phthalazinyl)-pyrazole and 1.8 g. of paraformaldehyde in 60 ml. of ethanol is treated with 5 g. of 1-(2-methyl-phenyl)-piperazine hydrochloride and 4 drops of concentrated hydrochloric acid and boiled under reflux for 24 hours. On cooling, the 5-methyl-4-{3-[4-(2-methyl-phenyl)-piperazino]-1-oxo-propyl}-1-(1-phthalazinyl) - pyrazole hydrochloride of the formula

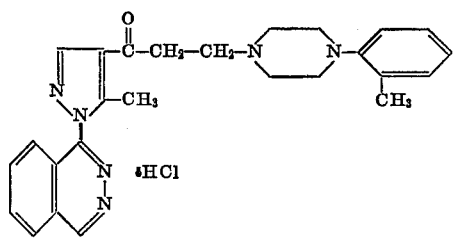

crystallizes out. On recrystallization from methanol, it melts at 215° (dec.).

The starting material used in the above reaction is prepared as follows: A mixture of 27 g. of ethoxymethylene-acetylacetone in 200 ml. of tetrahydrofuran is cooled to 0° and treated dropwise with a solution of 27 g. of 1-hydrazino-phthalazine in 600 ml. of tetrahydrofuran. The addition of the latter is completed after two hours and the reaction mixture is stirred for 18 hours at room temperature. The yellow crystalline material is filtered off and recrystallized from chloroform; the resulting hydrazone compound melts at 183°. A total of 10 g. of the latter is heated under an atmosphere of nitrogen to 190° for 6 hours. On cooling to room temperature, the reaction mixture is recrytsallized from methanol to afford colourless needles of 4-acetyl-5-methyl-1-(1-phthalazinyl)-pyrazole, M.P. 185–186°.

EXAMPLE 12

A mixture of 4.18 g. of 4-acetyl-1-(1-isoquinolyl)-5-methyl-pyrazole and 1.5 g. of paraformaldehyde in 50 ml. of ethanol is treated with 4.42 g. of 1-(2-methoxy-phenyl)-piperazine dihydrochloride and 2 drops of concentrated hydrochloric acid and is boiled under reflux for 24 hours. On cooling, 1-(1-isoquinolyl)-4-{3-[4-(2 - methoxy-phenyl)-piperazino]-1-oxo-propyl}-5-methyl - pyrazole hydrochloride of the formula

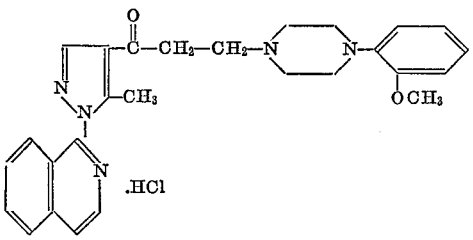

crystallizes out. On recrystallization from chloroform, it melts at 222° (dec.).

The starting material is prepared as follows: A solution of 10.4 g. of ethoxymethylene-acetylacetone in 50 ml. of tetrahydrofuran is cooled to 0° and treated with a solution of 10.6 g. of 1-hydrazino-isoquinoline in 400 ml. of tetrahydrofuran. The reaction mixture is stirred at room temperature for 18 hours. The crystalline precipitate is filtered and recrystallized from ethanol to afford 4-acetyl-1-(1-isoquinolyl)-5-methyl-pyrazole, M.P. 120°.

EXAMPLE 13

A mixture of 4.18 g. of 4-acetyl-1-(1-isoquinolyl)-5-methyl-pyrazole and 1.5 g. of paraformaldehyde in 50 ml. of ethanol is treated with 4.21 g. of 1-(4-fluoro-phenyl) piperazine dihydrochloride and 2 drops of concentrated hydrochloric acid and is boiled under reflux for 24 hours. On cooling, 4-{3-[4-(4-fluoro-phenyl)-piperazino]-1-oxo-propyl}-1-(1-isoquinolyl)-5-methyl - pyrazole hydrochloride of the formula

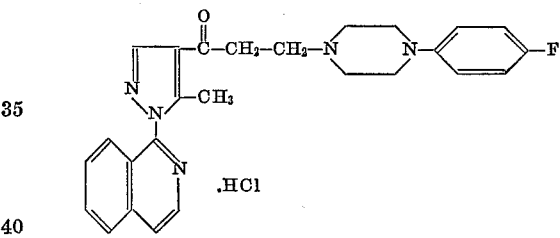

crystallizes out. On recrystallization from chloroform, it melts at 220° (dec.).

EXAMPLE 14

A mixture of 4.18 g. of 4-acetyl-1-(1-isoquinolyl)-5-methylpyrazole and 1.5 g. of paraformaldehyde in 50 ml. of ethanol is treated with 4.32 g. of 1-(2-methyl-phenyl)-piperazine hydrochloride and 2 drops of concentrated hydrochloric acid and boiled under reflux for 24 hours. On cooling, 1-(1-isoquinolyl)-5-methyl-4-{3-[4-(2 - methyl-phenyl)-piperazino]-1-oxo-propyl}-pyrazole hydrochloride of the formula

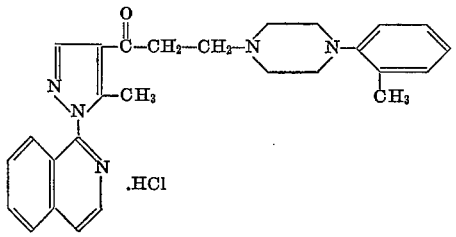

crystallizes out. On recrystallization from methanol, it melts at 237° (dec.).

EXAMPLE 15

A solution of 3 g. of 5-methyl-4-{3-[4 - (2 - methyl-phenyl)-piperazino]-1-oxo-propyl}-1-(1 - (2 - quinoxalinyl)-pyrazole hydrochloride in 150 ml. of 50% aqueous methanol is added dropwise with stirring to a stirred solution of 0.3 g. of sodium borohydride in 50 ml. of 56% aqueous methanol during 1 hour. The reaction mixture is stirred for another 1 hour at room temperature and then at 70° for 4 hours. The solution is then concentrated and extracted with chloroform. The dried chloroform extract is evaporated and the residue is crystallized from a mixture of chloroform and hexane to afford the 5-methyl-4-{1-hydroxy-3-[4-(2 - methyl - phenyl) - piperazino]-propyl}-1-(2-quinoxalinyl)-pyrazole of the formula

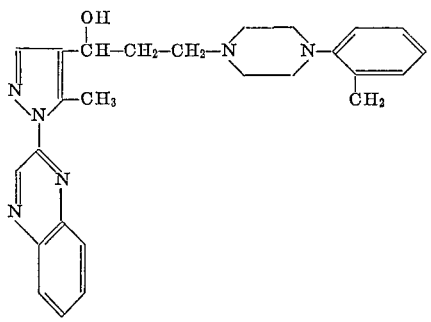

which melts at 112–113°.

EXAMPLE 16

20 g. of 5-methyl-4-{3-[4-(2-methyl-phenyl) - piperazino]-1-oxo-propyl}-1-(2-quinoxalinyl) - pyrazole hydrochloride are intimately mixed with 120 g. of corn starch and 100 g. of distilled water is added to the above mixture. The mass is well kneaded and dried at 45°. A mixture of 14 g. of talc and 6 g. of magnesium stearate is added to the above granules and mixed well. It is then compressed into tablets each containing 0.01 g. or 0.05 g. of the active ingredient.

EXAMPLE 17

A mixture of 2.57 g. of 4-acetyl-1-(2-benzthiazolyl)-5-methyl-pyrazole and 0.9 g. of paraformaldehyde in 30 ml. of ethanol is treated with 2.5 g. of 1-(2-methyl-phenyl)-piperazine dihydrochloride and 4 drops of concentrated hydrochloric acid and boiled under reflux for 24 hours. On cooling, 1-(2-benzthiazolyl)-5-methyl-4-{3 - [4 - (2-methyl-phenyl)-piperazino]-1-oxo-propyl} - pyrazol - hydrochloride of the formula

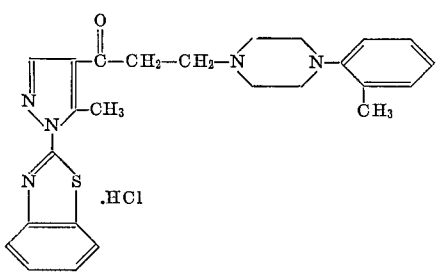

crystallizes out. On recrystallization from a mixture of chloroform and isopropanol, it melts at 225° (with decomposition).

The starting material is prepared as follows: A solution of 7.8 g. of ethoxymethylene-acetylacetone in 10 ml. of tetrahydrofuran is cooled to 0° and treated with a solution of 8.3 g. of 2-hydrazino-benzthiazole in 40 ml. of tetrahydrofuran. The reaction mixture is stirred at room temperature for 24 hours. It is evaporated to dryness and the residue is recrystallized from methanol to afford 4-acetyl-1-(2-benzthiazolyl)-5 - methyl - pyrazole which melts at 185°.

EXAMPLE 18

A mixture of 8.55 g. of 4-acetyl-1-(7-chloro-4-quinolyl)-5-methyl-pyrazole and 2.7 g. of paraformaldehyde in 120 ml. of absolute ethanol is treated with 7.5 g. of 1-(2-methyl-phenyl)-piperazine dihydrochloride and 10 drops of concentrated hydrochloric acid and is boiled under reflux for 24 hours. On cooling, the 1-(7-chloro-4-quinolyl)-5-methyl - 4 - {3 - [4 - (2-methyl-phenyl)- piperazino]-1-oxo-propyl} - pyrazole monohydrochloride monohydrate of the formula

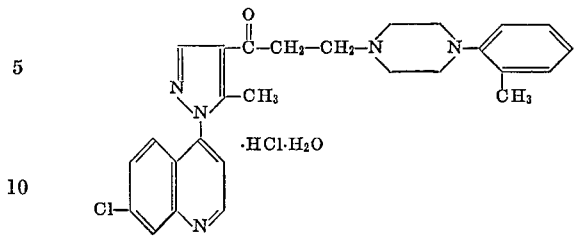

crystallizes out. After recrystallization from methanol, it melts at 230° (with decomposition).

The starting material is prepared as follows: A solution of 20.1 g. of ethoxymethylene-acetylacetone in 200 ml. dry tetrahydrofuran is cooled to 0° and treated with a solution of 25 g. of 7-chloro-4-hydrazino-quinoline in 250 ml. of tetrahydrofuran. The reaction mixture is stirred at room temperature for 24 hours and evaporated to dryness. The residue is heated at 190° for 6 hours under nitrogen; the pyrolysis product is triturated with 10 ml. of methanol and filtered. The crystalline mass is recrystallized from methanol to afford 4-acetyl-1-(7-chloro-4-quinolyl)-5-methyl-pyrazole, M.P. 142–146°.

EXAMPLE 19

A solution of 0.2 g. of 4-{1-hydroxy-3-[4-(2-methyl-phenyl)-piperazino]-propyl} - 5 - methyl - 1 - (2-quinoxalinyl)-pyrazole in 2 ml. of concentrated sulfuric acid is allowed to stand at room temperature for 4 hours and is then poured into ice. The crystalline precipitate is filtered and recrystallised from a mixture of methanol and ether to afford the 5-methyl-4-{3-[4-(2-methyl-phenyl)-piperazino]-prop-1-enyl} - 1 - (2-quinoxalinyl)-pyrazole sulphate of the formula

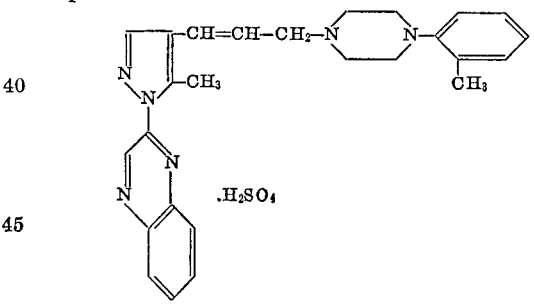

which melts at 199° (with decomposition).

EXAMPLE 20

A mixture of 0.1 g. of 4-{3-[4-(2-methyl-phenyl)-piperazino]-prop-1-enyl} - 5 - methyl-1-(2-quinoxalinyl)-pyrazole sulphate in 25 ml. of methanol is hydrogenated over 0.05 g. of a 10% palladium-on-charcoal catalyst at room temperature and normal pressure. After theoretical uptake of hydrogen, the hydrogenation is interrupted, the catalyst is filtered off, and the filtrate is evaporated to dryness. The residue is recrystallized from a mixture of isopropanol and ether to afford the 5-methyl-4-{3-[4-(2-methyl-phenyl) - piperazino]-propyl}-1-(2-quinoxalinyl)-pyrazole sulphate of the formula

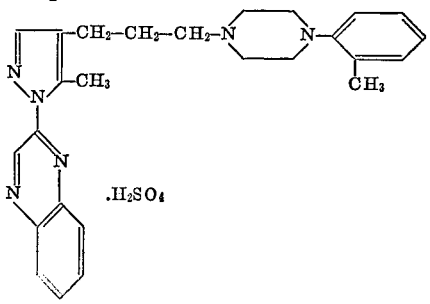

which melts at 293–295° (with decomposition).

EXAMPLE 21

A mixture of 3.48 g. of 4-(4-acetyl-5-methyl-1-pyrazolyl) - 1,2 - dihydro - 7 - ethoxy - 1,2,3 - benzothiadiazine-1,1-dioxide and 1.3 g. of paraformaldehyde in 50 ml. of ethanol is treated with 5.1 g. of 1-(4-fluorophenyl)-piperazine dihydrochloride and 4 drops of concentrated hydrochloric acid and is boiled under reflux for 24 hours, then evaporated to dryness. The residue is dissolved in water. The aqueous solution is washed with ether and basified with a 10% aqueous sodium carbonate solution. The liberated base is extracted with ethyl acetate and the organic extract is dried over anhydrous sodium sulphate and evaporated to dryness. The residue is dissolved in ether and treated with an ether solution of 1.2 g. maleic acid. A crystalline precipitate is formed, which is filtered off and recrystallized from a mixture of isopropanol and ether to yield the 1,2-dihydro-7-ethoxy-2-[4-(4-fluoro-phenyl) - piperazino - methyl]-4-{4-{3-[4-(4-fluoro-phenyl)-piperazino] - 1 - oxo-propyl}-5-methyl - 4 - pyrazolyl} - 1,2,3 - benzothiadiazine-1,1-dioxide maleate of the formula

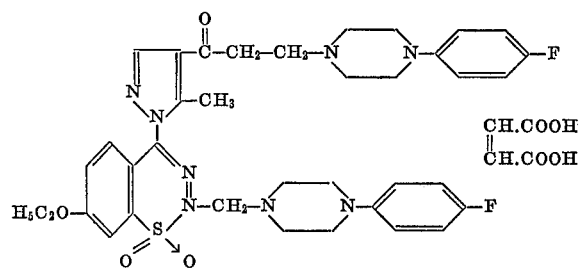

which melts at 161° (with decomposition).

The starting material is prepared as follows: A solution of 2.56 g. of 1,2-dihydro-7-ethoxy-4-hydrazino-1,2,3-benzothiadiazine-1,1-dioxide in 30 ml. of dioxane is cooled to 0° and treated with 1.56 g. of ethoxymethyleneacetylacetone in 5 ml. dioxane. The reaction mixture is stirred at room temperature for 24 hours and evaporated to dryness. The residue is recrystallized from a mixture of isopropanol and hexane to afford 4-(4-acetyl-5-methyl-1-pyrazolyl) - 1,2 - dihydro - 7 - ethoxy - 1,2,3 - benzothiadiazine-1,1-dioxide which melts at 172° C.

What is claimed is:

1. A compound selected from the group consisting of compounds of the formulae

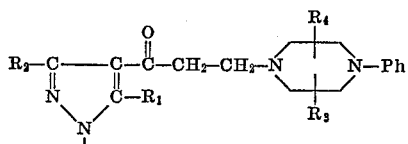

(I)

and

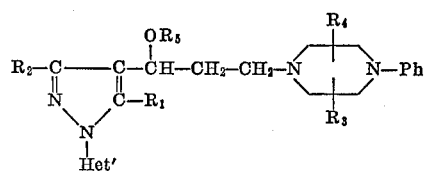

(II)

in which $R_1$ is lower alkyl, $R_2$ is a member selected from the group of hydrogen and lower alkyl, Het' is a C-attached member selected from the group consisting of unsubstituted and mono substituted 2-benzothiazolyl, a 2-quinolyl, a 4-quinolyl, 8-quinolyl, a 1-isoquinolyl, a 1-phthalazinyl, a 1,1 - dioxo-2H-1,2,3-benzothiadiazin-4-yl and a 2-quinoxalinyl, said substituents being selected from the group consisting of lower alkyl, lower alkoxy, trifluoromethyl and halogeno, Ph is a member selected from the group consisting of unsubstituted phenyl and mono substituted phenyl, the substituents being selected from the group consisting of lower alkyl, lower alkoxy, trifluoromethyl and halogeno, each of the groups $R_3$ and $R_4$ is a member selected from the group consisting of hydrogen and methyl, $R_5$ is a member selected from the group consisting of hydrogen and lower alkyl, and therapeutically acceptable acid addition salts thereof.

2. A compound as claimed in claim 1 and being selected from the group consisting of compounds of the Formulae I and II, according to claim 1, wherein $R_1$ is methyl, $R_2$ is hydrogen, Het' is a C-attached member selected from the group consisting of unsubstituted and mono substituted 2 - benzothiazolyl, 2-quinolyl, 4-quinolyl, 8-quinolyl, 1-isoquinolyl, 1-phthalazinyl, 1,1-dioxo-2H-1,2,3-benzothiadiazin-4-yl and 2-quinoxalinyl, said substituents being selected from the group consisting of methyl, methoxy, ethoxy, trifluoromethyl, chloro, bromo and fluoro, Ph is a member selected from the group consisting of unsubstituted and mono substituted phenyl, substituents being selected from the group consisting of methyl, methoxy, ethoxy, trifluoromethyl, chloro, bromo and fluoro, each of the groups $R_3$ and $R_4$ is a member selected from the group consisting of hydrogen and methyl, and $R_5$ is a member selected from the group consisting of hydrogen, methyl and ethyl, and therapeutically acceptable acid addition salts thereof.

3. A compound as claimed in claim 1 and being selected from the group consisting of compounds of the formulae

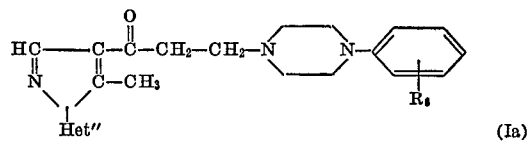

(Ia)

and

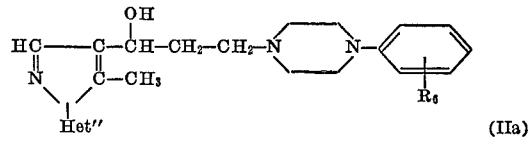

(IIa)

in which Het" is a C-attached member selected from the group consisting of unsubstituted and mono-substituted benzothiazolyl, 4-quinolyl, isoquinolyl, 1-phthalazinyl and 2-quinoxalinyl, substituents being selected from the group consisting of lower alkyl, lower alkoxy and halogeno, and $R_6$ represents a member selected from the group consisting of hydrogen, lower alkyl, lower alkoxy, trifluoromethyl and halogeno, and therapeutically acceptable acid addition salts thereof.

4. A compound as claimed in claim 1 and being selected from the group consisting of the compounds of Formulae Ia and IIa, wherein $R_1$ is methyl, $R_2$, $R_3$, $R_4$ are hydrogen, Het" is a member selected from the group consisting of an unsubstituted and mono-substituted 2-benzothiazolyl, 2-quinolyl, 4-quinolyl, 8-quinolinyl, 1-isoquinolyl, 1-phthalazinyl, 1,1-dioxo-2H-1,2,3-benzothiodiazin-5-yl and 2-quinoxalinyl, substituents being selected from the group consisting of methyl, ethyl, methoxy, ethoxy, fluoro, chloro and bromo, and Ph is phenyl monosubstituted by a member selected from the group consisting of methyl, methoxy, ethoxy, trifluoromethyl, fluoro, chloro and bromo, and therapeutically acceptable acid addition salts thereof.

5. A compound as claimed in claim 1 and being selected from the group consisting of the compounds of Formulae Ia and IIa, wherein $R_1$ is methyl, $R_2$, $R_3$, $R_4$ and $R_5$ are hydrogen, Het" is a member selected from the group consisting of 2-quinoxalinyl and 3-methyl-2-quinoxalinyl, and Ph is unsubstituted or phenyl mono-substituted by a member selected from the group consisting of hydrogen, lower alkyl, lower alkoxy, trifluoromethyl and halogeno, and therapeutically acceptable acid addition salts thereof.

6. A compound as claimed in claim 1 and being selected from the group consisting of the compounds of Formulae Ia and IIa, $R_1$ is methyl, $R_2$, $R_3$, $R_4$ and $R_5$ are hydrogen, Het" is a member selected from the group consisting of 2-quinoxalinyl and 3-methyl-2-quinoxalinyl, and Ph is phenyl mono-substituted by a member selected from the group consisting of methyl, methoxy, ethoxy, trifluoromethyl, fluoro, chloro and bromo, and therapeutically acceptable acid addition salts thereof.

7. A compound as claimed in claim 1 and being a member selected from the group consisting of 5-methyl-4{3 - [4 - (2 - methyl-phenyl)-piperazino]-1-oxo-propyl}-1-(2-quinoxalinyl)-pyrazole and therapeutically acceptable acid addition salts thereof.

8. A compound as claimed in claim 1 and being a member selected from the group consisting of 4-{3-[4-(4-fluoro-phenyl) - piperazino]-1-oxo-propyl} - 5 - methyl-1-(3-methyl-2-quinoxalinyl)-pyrazole, and therapeutically acceptable acid addition salts thereof.

9. A compound as claimed in claim 1 and being a member selected from the group consisting of 4-{3-[4-(2-chlorophenyl) - piperazino] - 1 - oxo-propyl}-5-methyl-1-(2-quinoxalinyl)-pyrazole, and therapeutically acceptable acid addition salts thereof.

10. A compound as claimed in claim 1 and being a member selected from the group consisting of 5-methyl-4 - {1 - hydroxy - 3 - [4 - (2 - methyl-phenyl)-piperazino]-propyl} - 1 - (2-quinoxalinyl)-pyrazole, or therapeutically acceptable acid addition salts thereof.

References Cited
UNITED STATES PATENTS

| | | | |
|---|---|---|---|
| 3,362,956 | 1/1968 | Archer | 260—268 |
| 3,367,936 | 2/1968 | Koppe | 260—268 |

ALEX MAZEL, Primary Examiner

D. G. DAVIS, Assistant Examiner

U.S. Cl. X.R.

260—242, 240, 243, 239, 250, 288, 304, 307, 309.2, 594, 690, 689; 424—232, 250

CASE CIN-11/1+2

PO-1050
(5/69)

UNITED STATES PATENT OFFICE
CERTIFICATE OF CORRECTION

Patent No. 3,472,857                Dated October 14, 1969

Inventor(s) VISHWA PRAKASH ARYA

It is certified that error appears in the above-identified patent and that said Letters Patent are hereby corrected as shown below:

Column 18, lines 30 and 35, amend the left-hand portion of the formula to read:

line 56, delete "5" and insert --- 4 --- .

SIGNED AND
SEALED
DEC 29 1970

(SEAL)
Attest:

Edward M. Fletcher, Jr.
Attesting Officer

WILLIAM E. SCHUYLER, JR.
Commissioner of Patents